US009887459B2

(12) United States Patent
Casciato et al.

(10) Patent No.: US 9,887,459 B2
(45) Date of Patent: Feb. 6, 2018

(54) RECONFIGURABLE APERTURE FOR MICROWAVE TRANSMISSION AND DETECTION (71) Applicant: Raytheon BBN Technologies Corp., Cambridge, MA (US)

(72) Inventors: Mark D. Casciato, Arlington, VA (US); Matthew John Rebholz, Fairfax, VA (US); Justin Wales Swartz, Arlington, CA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 1067 days.

(21) Appl. No.: 14/039,179

(22) Filed: Sep. 27, 2013

(65) Prior Publication Data
US 2015/0091756 A1    Apr. 2, 2015

(51) Int. Cl.
*H01Q 3/00*    (2006.01)
*H01Q 3/44*    (2006.01)
(Continued)

(52) U.S. Cl.
CPC ............ *H01Q 3/44* (2013.01); *G02B 5/1876* (2013.01); *H01Q 15/02* (2013.01);
(Continued)

(58) Field of Classification Search
CPC .... G02B 5/1876; G02B 5/1895; G02B 27/44; H01Q 3/20; H01Q 3/44; H01Q 15/02; H01Q 19/065; G01S 7/03
(Continued)

(56) References Cited

U.S. PATENT DOCUMENTS 3,312,519 A * 4/1967 Erhard ................ G02B 5/1876
359/286
4,905,014 A * 2/1990 Gonzalez ................ H01Q 3/46
343/700 MS (Continued)

FOREIGN PATENT DOCUMENTS

FR      2858469 A1     2/2005
WO  WO-2007/136289 A1  11/2007

OTHER PUBLICATIONS

"International Application Serial No. PCT/US2014/044092, International Search Report dated Oct. 16, 2014", 4 pgs.
(Continued)

*Primary Examiner* — Chuong P Nguyen
(74) *Attorney, Agent, or Firm* — Schwegman Lundberg & Woessner, P.A.

(57) ABSTRACT

A reconfigurable aperture includes a plurality of metallic particles confined to a volume extending across an aperture area. The metallic particles are repositioned within the volume to form opaque regions in the aperture area. The opaque regions, and transmissive regions between the opaque regions, can form a reconfigurable zone plate that can change the collimation of a microwave beam via diffraction therethrough. The zone plate can be located a fixed distance away from a microwave source and a detector in a housing, so that for any specified wavelength produced by the microwave source, the zone plate can reconfigure to have a focal length equal to the fixed distance. The reconfigurable zone plate can effectively collimate microwaves produced by the microwave source, can direct the collimated microwaves in a specified direction, can receive microwaves returning along the specified direction, and can focus the received microwaves onto the detector.

16 Claims, 6 Drawing Sheets (51) Int. Cl.
*G02B 5/18* (2006.01)
*H01Q 15/02* (2006.01)
*H01Q 19/06* (2006.01)
*G02B 27/44* (2006.01)
*H01Q 3/20* (2006.01)
*G01S 7/03* (2006.01)

(52) U.S. Cl.
CPC .............. *H01Q 19/065* (2013.01); *G01S 7/03* (2013.01); *G02B 27/44* (2013.01); *H01Q 3/20* (2013.01)

(58) Field of Classification Search
USPC .......................... 342/368, 371, 377; 359/565
See application file for complete search history.

(56) References Cited

U.S. PATENT DOCUMENTS

| | | | | |
|---|---|---|---|---|
| 6,167,112 | A * | 12/2000 | Schneider | G21K 1/06 378/145 |
| 6,720,936 | B1 * | 4/2004 | Koolish | H01Q 3/01 343/909 |
| 6,894,652 | B2 * | 5/2005 | Rawnick | H01Q 3/44 343/753 |
| 7,061,447 | B1 * | 6/2006 | Bozler | H01Q 19/065 343/753 |
| 7,420,737 | B2 * | 9/2008 | Williams | G02B 3/14 349/201 |
| 7,456,803 | B1 * | 11/2008 | Sievenpiper | H01Q 15/02 343/700 MS |
| 8,049,963 | B2 * | 11/2011 | Menon | G02B 3/10 359/565 |
| 9,151,891 | B2 * | 10/2015 | Ma | B82Y 20/00 |
| 9,529,126 | B2 * | 12/2016 | Jiang | G02B 5/1828 |
| 2004/0160382 | A1 | 8/2004 | Rawnick et al. | |
| 2008/0210882 | A1 * | 9/2008 | Hyde | G01J 1/4228 250/394 |
| 2009/0052619 | A1 * | 2/2009 | Endoh | G01N 23/04 378/43 |
| 2010/0155609 | A1 * | 6/2010 | Silva | G01S 7/00 250/363.06 |
| 2015/0022892 | A1 * | 1/2015 | Schuetz | G21K 1/06 359/565 |
| 2016/0085104 | A1 * | 3/2016 | Zhang | G02F 1/13394 428/195.1 |
| 2016/0306079 | A1 * | 10/2016 | Arbabi | G02B 5/0263 |

OTHER PUBLICATIONS

"International Application Serial No. PCT/US2014/044092, Written Opinion dated Oct. 16, 2014", 5 pgs.

Antonets, I. V., et al., "Conducting and Reflecting Properties of Thin Metal Films", *Technical Physics*, 49(11), (Nov. 2004), 1496-1500.

Cumby, B. L., et al., "Reconfigurable liquid metal circuits by Laplace pressure shaping", *Appl. Phys. Lett.*, 101, (2012), 174102-1-174102-5.

Fong, B. H., et al., "Scalar and Tensor Holographic Artificial Impedance Surfaces", *IEEE Transations on Antennas and Propagation*, 58(10), (Oct. 2010), 3212-3221.

Haider, N., et al., "Recent Developments in Reconfigurable and Multiband Antenna Technology", *International Journal of Antennas and Propagation*, vol. 2013, (2013), 1-14.

Haupt, R. L., et al., "Reconfigurable and Adaptive Antennas Using Materials with Variable Conductivity", *Second NASA/ESA Conference on Adaptive Hardware and Systems (AHS 2007)*, (2007), 4 pgs.

Hristov, H. D., et al., "Millimeter-Wave Fresnel-Zone Plate Lens and Antenna", IEEE *Transactions on Microwave Theory and Techniques*, 43(12), (Dec. 1995), 2779-2785.

Huynh, T., et al., "Cross Polarization Characteristics of Rectangular Patch Antennas", *Antennas and Propagation Society International Symposium*, 1988. AP-S Digest, (1988), 708-711.

Khan, M. R., et al., "A frequency shifting liquid metal antenna with pressure responsiveness", *Appl. Phys. Lett.*, 99, (2011), 013501-1-013501-3.

Kock, W. E., et al., "Holograms and Zone Plates", *Proc. IEEE*, 54(11), (Nov. 1966), 1599-1601.

Kock, W. E., et al., "Metallic Delay Lenses", *Bell System Technical Journal*, 27, (Jan. 1948), 58-82.

Meltaus, J., et al., "Millimeter-Wave Beam Shaping Using Holograms", *IEEE Transactions on Microwave Theory and Techniques*, 51(4), (Apr. 2003), 1274-1280.

Petosa, A., et al., "Reconfigurable Fresnel-Zone-Plate-Shutter Antenna with Beam-Steering Capability", *IEEE Antennas and Propagation Magazine*, 49(5), (Oct. 2007), 42-51.

Reid, D. R., "A Full Electromagnetic Analysis of Fresnel Zone Plate Antennas and the Application to a Free-Space Focused-Beam Measurement System", Ph.D Thesis, Georgia Institute of Technology, (Dec. 2008), 224 pgs.

Shackelford, A. K,, et al., "Design of Small-Size Wide-Bandwidth Microstrip-Patch Antennas", *IEEE Antennas and Propagation Magazine*, 45(1), (Feb. 2003), 75-83.

* cited by examiner

RECONFIGURABLE APERTURE FOR MICROWAVE TRANSMISSION AND DETECTION

TECHNICAL FIELD

Examples pertain to a reconfigurable aperture for microwave transmission and detection, in which metallic particles are repositioned dynamically to form opaque regions in the aperture. The opaque regions, and the transmissive regions therebetween, can be sized and shaped as a diffractive zone plate. The reconfigurable aperture can also be applied to communications systems or systems that transmit, receive, and/or steer microwave radiation.

BACKGROUND

In radar applications, it is common to send a signal away from a radar station along a particular direction, receive a reflected signal at the radar station along the particular direction, and use the time of flight between the sent and received signals to determine a distance away from the radar station of a particular reflecting object. The sent signal can be pulsed, and can be sent with a randomly-varying wavelength, in order to avoid detection.

Many current radar systems use active electronically scanned arrays (AESAs). A typical AESA system includes an array of modules that can both transmit and receive signals. The AESA system can steer the outgoing signals by controlling the times at which the modules emit their respective signals. The outgoing signals effectively form a wavefront, and the sensitivity of the AESA is greatest along a direction that is perpendicular to the wavefront; this sensitivity is analogous to a condition of constructive interference for optical phenomena.

One potential drawback to AESAs is that they can be complex and expensive. For instance, a typical AESA system can include multiple transmission lines, phase shifter and RF front ends.

SUMMARY

In a transmission and detection system, a source directs microwaves to a reconfigurable aperture. The reconfigurable aperture can dynamically reposition small (sub-wavelength) metallic particles to appear as a zone plate, with a controllable focal length and a controllable center. The controllable focal length allows the detection system to collimate any suitable wavelength emitted by the source. The controllable center allows the detection system to direct the collimated microwaves outward in any suitable direction from the detection system.

In some examples, a reconfigurable aperture includes a plurality of metallic particles confined to a volume extending across an aperture area. The metallic particles are repositioned within the volume to form opaque regions in the aperture area. The opaque regions, and transmissive regions between the opaque regions, can form a reconfigurable zone plate that can change the collimation of a microwave beam via diffraction therethrough. The zone plate can be located a fixed distance away from a microwave source and a detector in a housing, so that for any specified wavelength produced by the microwave source, the zone plate can reconfigure to have a focal length equal to the fixed distance. The reconfigurable zone plate can effectively collimate microwaves produced by the microwave source, can direct the collimated microwaves in a specified direction, can receive microwaves returning along the specified direction, and can focus the received microwaves onto the detector.

There are potential advantages to using such a reconfigurable aperture as a collimating/focusing element in a transmission and detection system. For instance, such a reconfigurable aperture can operate over very large operating bandwidths, such as over a frequency range from 300 MHz (corresponding to a wavelength of 1 m) to 300 GHz (corresponding to a wavelength of 1 mm), or a range from 1 GHz (30 cm) to 100 GHz (3 mm). As another example, such a reconfigurable aperture can rely on the physical principles of diffraction and scattering, without using the relatively complicated multiple transmission lines, phase shifter and RF front ends of the AESA systems. As another example, such a reconfigurable aperture can optionally be curved, rather than flat, to allow for conformal geometries. Other advantages are also possible.

This summary is intended to provide an overview of subject matter of the present patent application. It is not intended to provide an exclusive or exhaustive explanation of the invention. The Detailed Description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
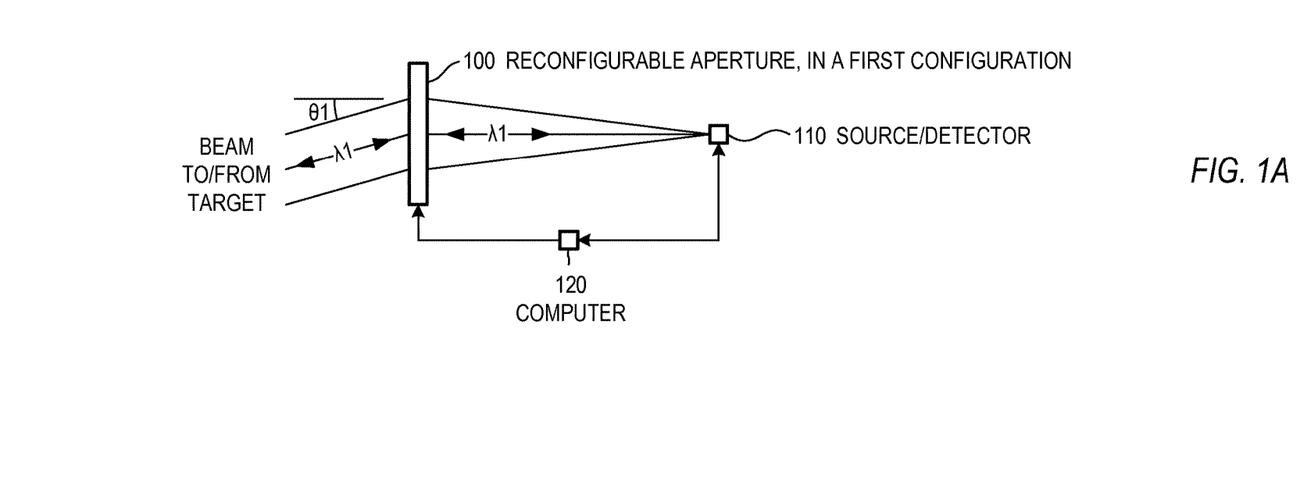
FIG. 1A is a schematic drawing of an example of a transmission and detection system, including a reconfigurable aperture in a first configuration.

FIG. 1A is a schematic drawing of an example of a transmission and detection system, in a first configuration.

The system includes a source/detector 110, which can be optionally packaged as a single unit, or can be packaged as separate units in close proximity to each other. The source/detector 110 includes a microwave source configured to produce microwaves at a selectable specified wavelength within a specified range of wavelengths. Suitable wavelength ranges can include 3 mm to 30 cm, 3 mm to 1 m, 1 mm to 30 cm, 1 mm to 1 m, and other suitable ranges. The source/detector 110 includes a detector that is sensitive in the wavelength range of the microwave source, which can receive detected microwave radiation and convert the received microwave radiation into an electrical signal.

The system includes a computer 120. The computer 120 controls an output wavelength and an output power of the source, and can provide suitable trigger signals to switch the microwave source on and off. The computer 120 receives the electrical signal from the detector. The computer 120 can optionally provide a switching mechanism between the microwave source and the detector.

The system includes a reconfigurable aperture 100. The reconfigurable aperture 100 functions like a lens, which can collimate microwaves emitted by the source and direct the collimated microwaves to a particular target. The computer 120 controls the reconfiguration of the reconfigurable aperture 100. In the first configuration of FIG. 1A, the wavelength of the microwaves from the source is λ1, and the emission angle from the system is θ1. For microwaves emitted by the source that reflect from a particular object, the reflected microwaves retrace their paths along the emission direction, and arrive back at the reconfigurable aperture 100 at angle θ1. The reconfigurable aperture 100 focuses the returning microwaves onto the detector at source/detector 110. The system uses a time of flight delay to determine the distance between the system and the particular object.

Figure 1B:
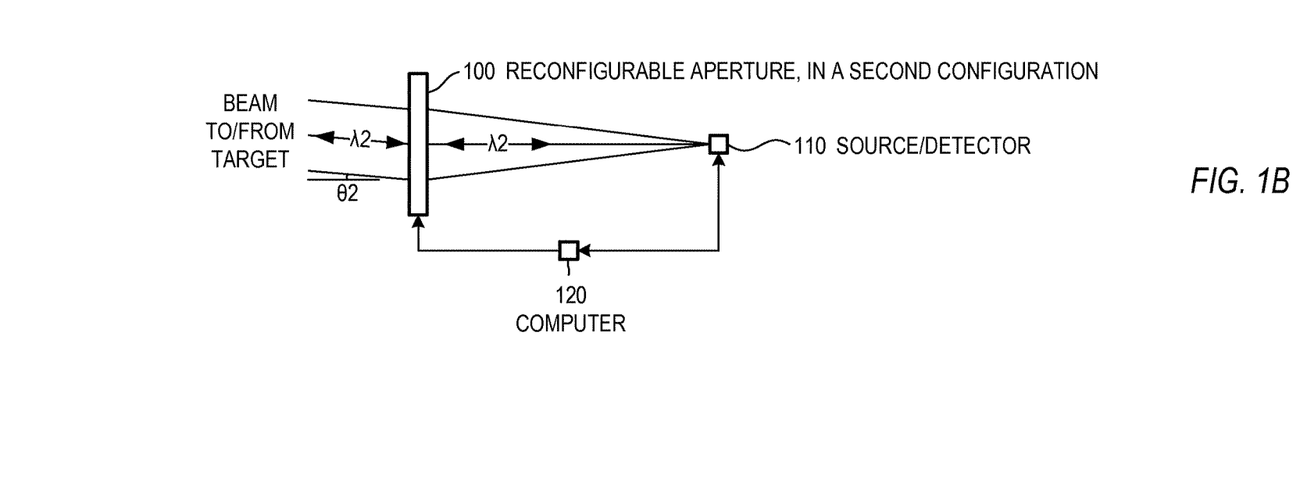
FIG. 1B is a schematic drawing of the transmission and detection system of FIG. 1A, with the reconfigurable aperture in a second configuration.

FIG. 1B is a schematic drawing of an example of the transmission and detection system, in a second configuration. In this second configuration, the reconfigurable aperture 100 is configured to operate at a wavelength λ2 different from wavelength λ1, and at an emission/detection angle θ2 different from angle θ1. In other configurations, one or both of the wavelength and angle are varied over suitable ranges. The emission/detection angles can additionally extend out of the plane of the page in FIGS. 1A and 1B, so that a typical range of emission/detection angles includes a range of solid angles less than 2π steradians.

Figure 2:
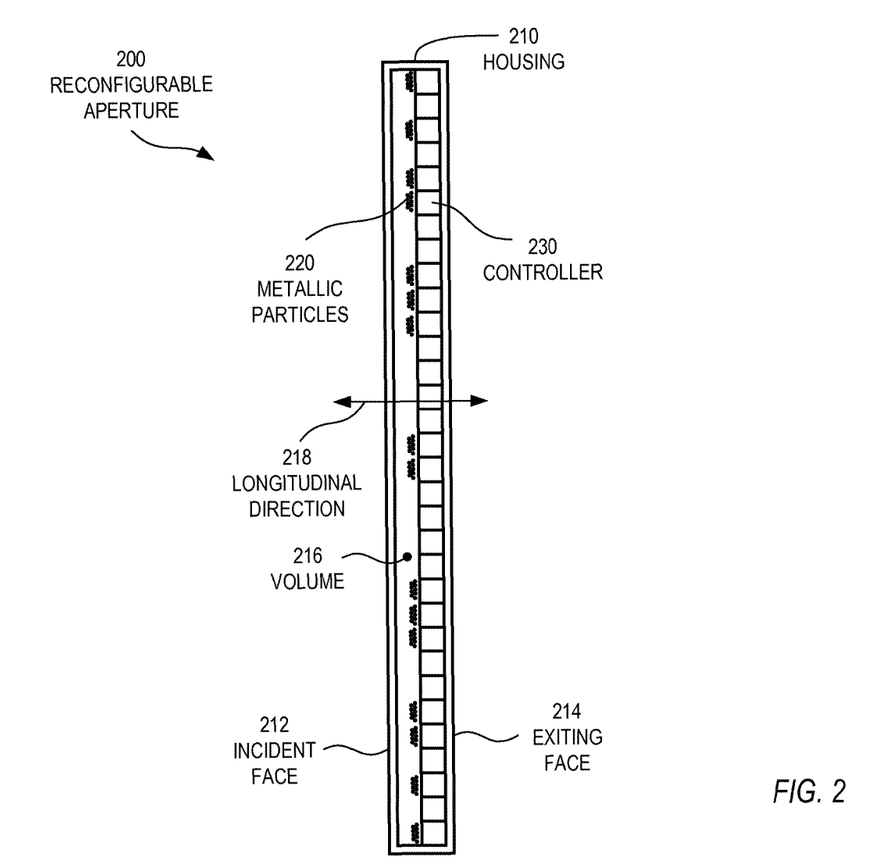
FIG. 2 is a schematic drawing of an example of a reconfigurable aperture.

FIG. 2 is a schematic drawing of an example of a reconfigurable aperture 200.

The reconfigurable aperture 200 includes a housing 210. The housing 210 includes an incident face 212 and an opposing exiting face 214. The housing 210 encloses a volume 216 between the incident face 212 and the exiting face 214. In some examples, the volume 216 is generally planar. In some examples, the volume 216 may include an overall curvature, such as an outward-bowed curvature that can accommodate a conformal geometry. It is understood that the term generally planar includes such overall curvature, and that the volume 216 has a longitudinal thickness that is less, or significantly less, than a radius or radii of curvature of the volume 216. The incident face 212 and the exiting face 214 define a longitudinal direction 218 therebetween. The housing 210 is configured to receive and transmit microwave radiation therethrough through the incident face 212 and the exiting face 214.

The reconfigurable aperture 200 includes metallic particles 220 disposed within the volume 216. The metallic particles are smaller than a wavelength of microwave radiation, and are typically smaller than 1 mm in diameter. Each metallic particle can include a metallic coating on a dielectric core, or can be solidly metallic throughout. The metallic particles 220 attenuate microwave radiation incident thereon, such as by conducting internal electrical currents within the particles 220 that siphon off energy from a transmitted microwave beam, or by direct absorption of the microwave radiation by the metallic particles 220.

The reconfigurable aperture 200 includes a controller 230 configured to reposition the metallic particles 220 within the volume 216 to form opaque regions in the aperture area. The controller 230 can include a plurality of pixels, which can be arranged in a rectilinear configuration or other suitable configuration. When activated by the controller 230, each pixel is configured to attract metallic particles 220 in the volume 216. The attracted metallic particles 220 can cluster around the corresponding activated pixels of the controller 230. A cluster of metallic particles 220 can be sufficiently thick to block microwave radiation, through electrical conduction or absorption. In some examples, the clusters of metallic particles 220 are completely opaque. In other examples, the clusters of metallic particles 220 are partially opaque. The clusters of metallic particles 220 can include one or more transmissive regions therebetween. The transmissive regions can be completely or partially transparent, and can be devoid or largely devoid of metallic particles 220. Suitable controllers 230 can be electrostatic, electromagnetic, magnetostatic, or can use other suitable technology to dynamically reposition the particles 220.

One possible use for the reconfigurable aperture 200 is to arrange the metallic particles 220 as a reconfigurable zone plate. The zone plate can have an adjustable focal length, which can ensure proper collimation of the exiting beam directed out of the transmission and detection system, for a selected wavelength. The zone plate can also have an adjustable center, which can ensure that the exiting beam points in a selected direction away from the transmission and detection system.

Figure 3:
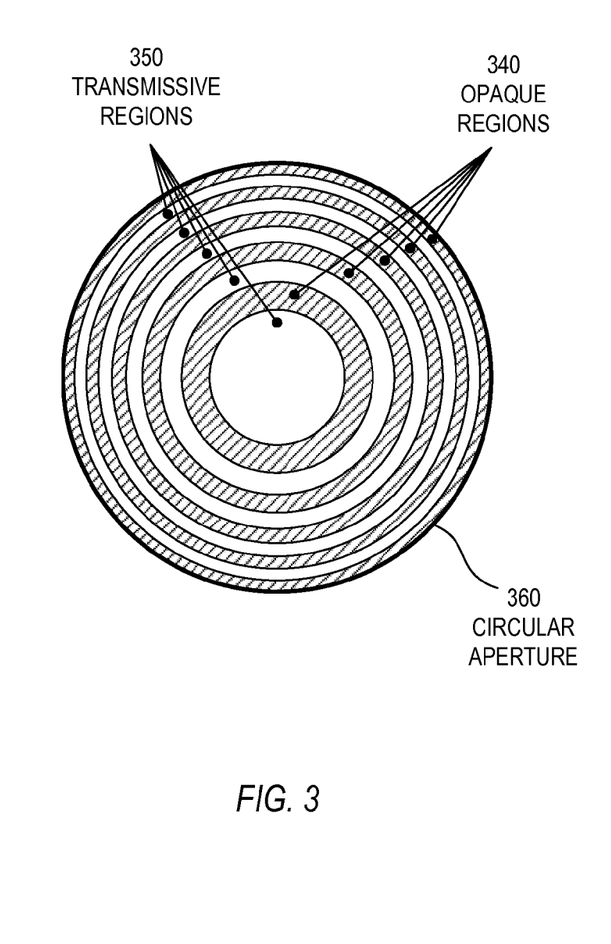
FIG. 3 is an end-on schematic drawing of an example of a configuration of opaque and transmissive regions in a reconfigurable zone plate.

FIG. 3 is an end-on schematic drawing of an example of a configuration of opaque regions 340 and transmissive regions 350 in a reconfigurable zone plate. In some examples, the opaque regions 340 and transmissive regions 350 are circular and concentric. In some examples, the opaque regions 340 and transmissive regions 350 are spaced closer together at increasing distances from their centers. In some examples, the opaque regions 340 and transmissive regions 360 have radii that determine a characteristic focal length for a given wavelength.

In this example, the regions 340 and 350 are centered within a circular aperture 360 of the zone plate. As a result, microwaves emitted from a source at a centered location behind the zone plate are collimated by the zone plate and emerge perpendicular to the zone plate. In other examples, the aperture can be be elliptical, rectangular, square, polygonal, or other suitable shape.

Figure 4:
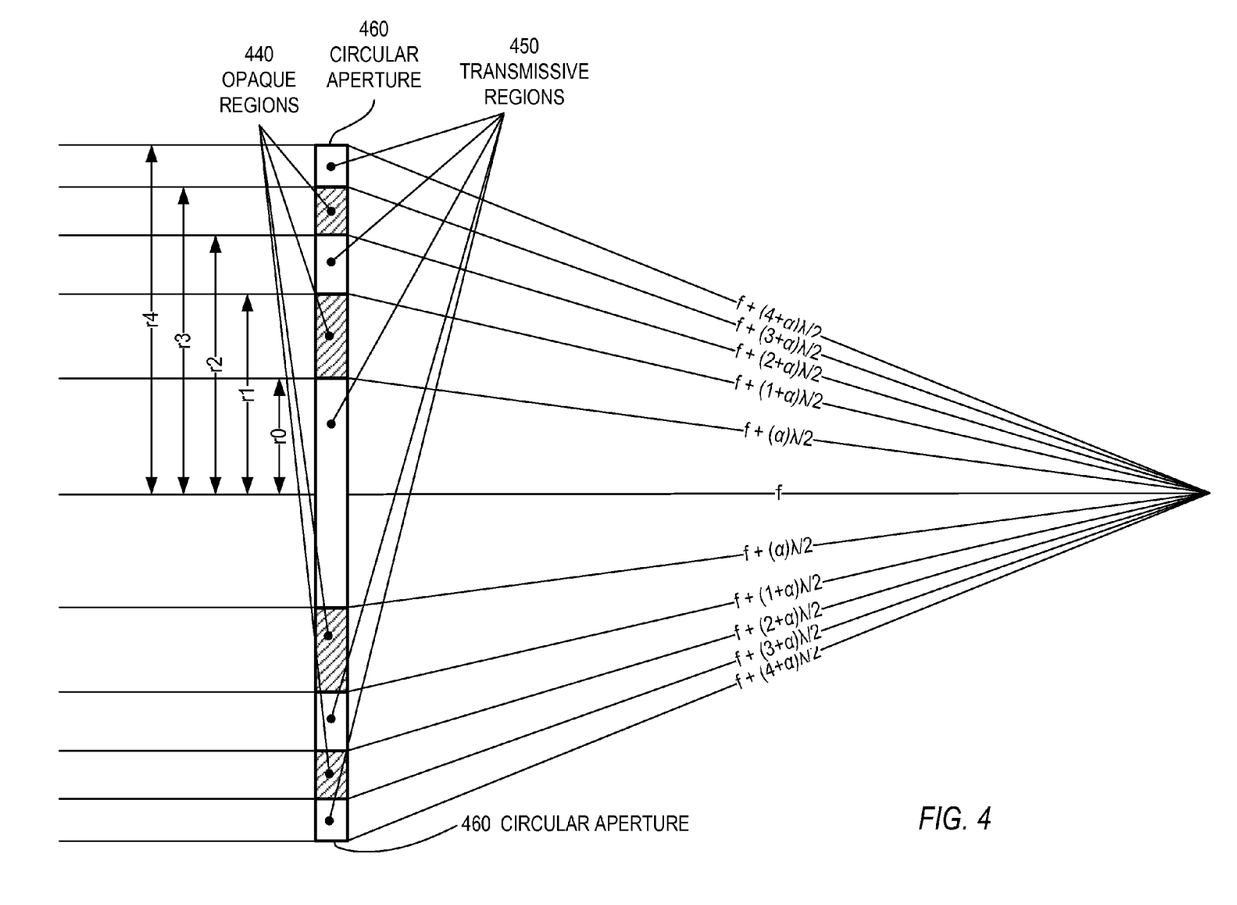
FIG. 4 is a side view schematic drawing of an example of geometry that can define the location of zone edges in a zone plate.

FIG. 4 is a side-view schematic drawing of an example of zone plate geometry, which shows the relationship among zone radii, focal length, and wavelength. The zeroth zone is a central zone that surrounds the longitudinal axis of the zone plate. The first zone annularly surrounds the zeroth zone. The second zone annularly surrounds the first zone, and so forth. For the geometry of FIG. 4, the Pythagorean theorem can predict the radius of the nth zone:

$$r_n = [(n+\alpha)\lambda f + (n+\alpha)^2 \lambda^2 / 4]^{1/2}, \quad (1)$$

where λ is the wavelength of the microwave radiation, f is the focal length of the zone plate (which, in the geometry of FIG. 4, equals the distance between the zone plate and the image point), and α is a dimensionless reference phase. In general, the zone radii ensure that microwaves from a particular zone are out of phase with microwaves from adjacent zones. In the example of FIG. 4, the even-numbered zones are transmissive, and the odd-numbered zones are opaque. In other examples, the even-numbered zones can be opaque, and the odd-numbered zones can be transmissive.

Equation (1) provides a relationship among the zone radii $r_n$, the focal length f, and the wavelength λ. During use in the transmission and detection system, it is desirable that the emergent beam be collimated, for each randomly-selected wavelength. As such, it is desirable to maintain a constant focal length f, for each configuration of the zones. The zone radii $r_n$ can be selected to keep the focal length f as the wavelength $\lambda$ is varied.

Figure 5:
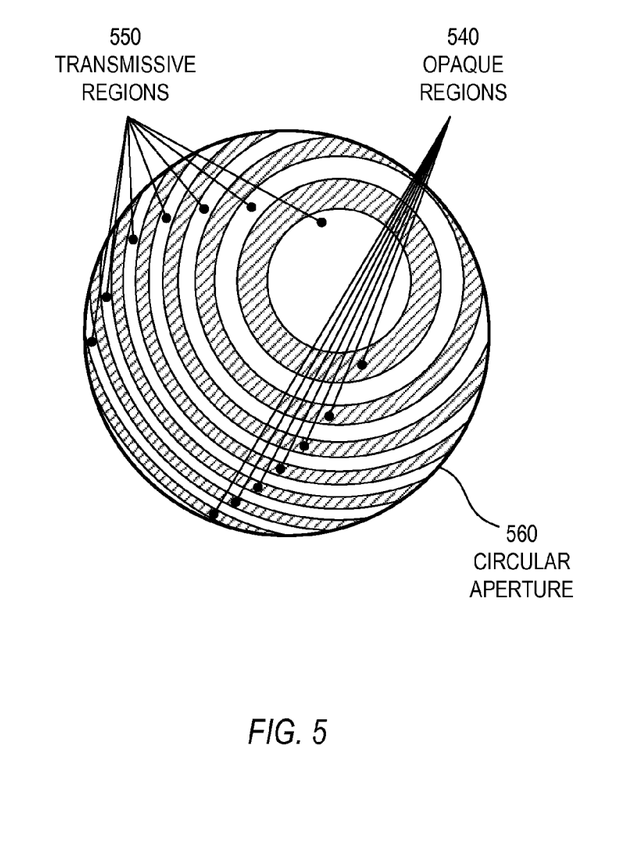
FIG. 5 is an end-on schematic drawing of another example of a configuration of opaque and transmissive regions in a reconfigurable zone plate.

FIG. 5 is an end-on schematic drawing of another example of a configuration of opaque and transmissive regions in a reconfigurable zone plate. In this example, the regions 540 and 550 are nested and concentric, but are laterally shifted within the circular aperture 560 of the zone plate. As a result, microwaves emitted from a source at a centered location behind the zone plate are also collimated by the zone plate, but emerge at a particular angle with respect to a longitudinal axis of the zone plate, as in the geometries of FIGS. 1A and 1B. The tangent of the angular displacement of the emergent microwave beam is given by the lateral displacement of the opaque and transmissive regions 540, 550, divided by the focal length of the zone plate. By positioning the center of the concentric regions away from the center of the zone plate, the emergent microwave beam can be dynamically steered.

Figure 6:
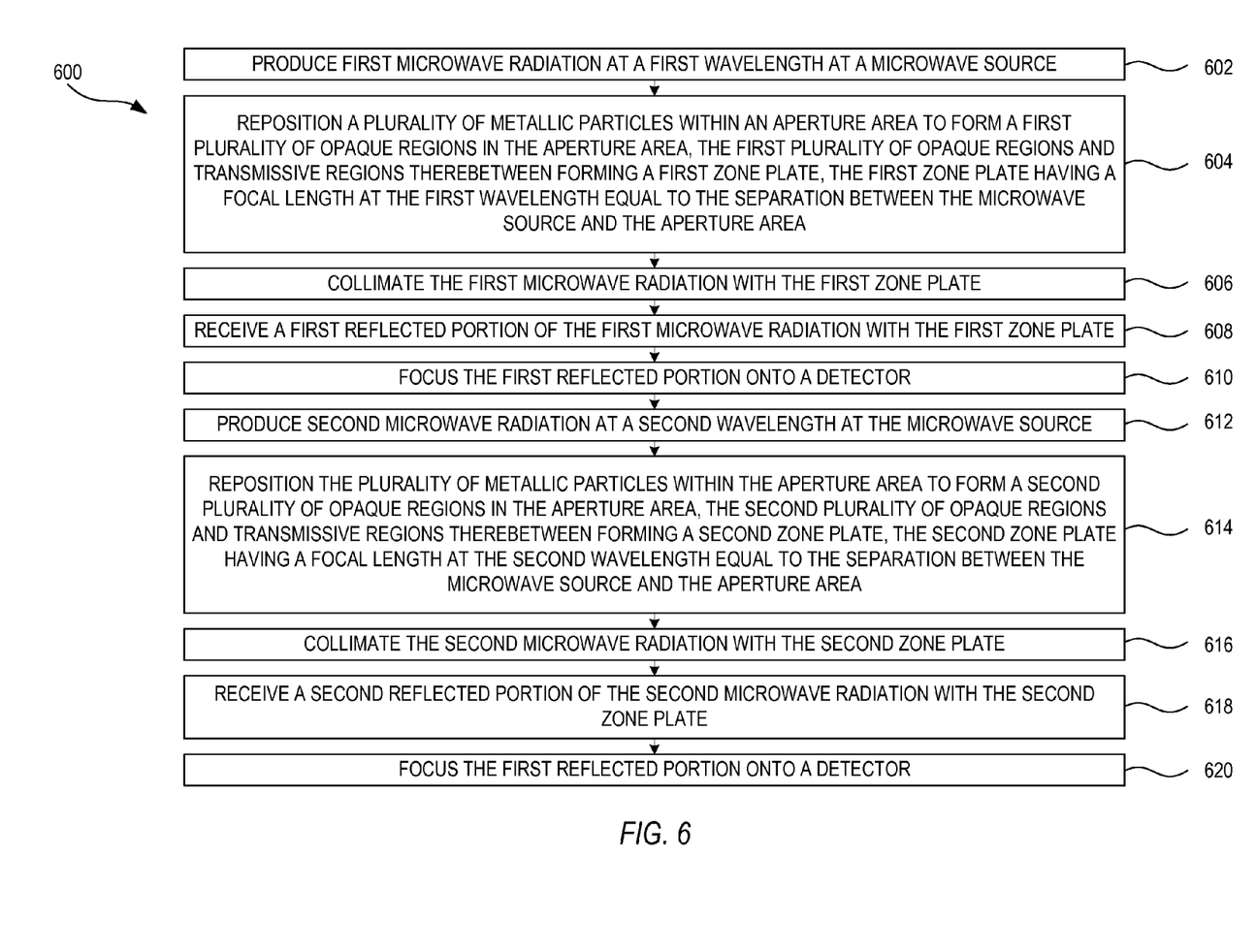
FIG. 6 is a flow chart of an example of a method of operation of a reconfigurable zone plate.

FIG. 6 is a flow chart of an example of a method of operation 600 of a reconfigurable aperture, such as the reconfigurable aperture of FIGS. 1-5. Step 602 produces first microwave radiation at a first wavelength at a microwave source. Step 604 repositions a plurality of metallic particles within an aperture area to form a first plurality of opaque regions in the aperture area. The first plurality of opaque regions and transmissive regions therebetween form a first zone plate. The first zone plate has a focal length at the first wavelength equal to the separation between the microwave source and the aperture area. Step 606 collimates the first microwave radiation with the first zone plate. Step 608 receives a first reflected portion of the first microwave radiation with the first zone plate. Step 610 focuses the first reflected portion onto a detector. Step 612 produces second microwave radiation at a second wavelength at the microwave source. Step 614 repositions the plurality of metallic particles within the aperture area to form a second plurality of opaque regions in the aperture area. The second plurality of opaque regions and transmissive regions therebetween forms a second zone plate. The second zone plate has a focal length at the second wavelength equal to the separation between the microwave source and the aperture area. Step 616 collimates the second microwave radiation with the second zone plate. Step 618 receives a second reflected portion of the second microwave radiation with the second zone plate. Step 620 focuses the second reflected portion onto the detector.

In some examples, the first plurality of opaque regions and transmissive regions therebetween have a first center in a plane of the aperture area, the second plurality of opaque regions and transmissive regions therebetween have a second center in the plane of the aperture area, and the first and second centers are laterally separated within the plane of the aperture area.

The examples of FIGS. 1-6 use the reconfigurable aperture as a reconfigurable zone plate. Other uses for the reconfigurable aperture are also possible. For instance, the reconfigurable aperture can be used as a reflective tag/beacon. In a reflective tag/beacon, the pattern of opaque regions and transmissive regions adaptively reconfigures as a function of angle of arrival and frequency, so that it steers a beam back at an interrogator. The reflective tag/beacon can optionally include a spatial data exfil. As another example, the reconfigurable aperture can be used a spoofer, which adaptively responds to an interrogating radar. The spoofer can controllably move the apparent position of an aircraft. As another example, the reconfigurable aperture can be used as a reflector antenna, which can be used for beam steering, and can include piggyback spatial data for exfil. As another example, the reconfigurable aperture can be used to affect the orbital angular momentum of a beam transmitted therethrough, which can be useful for beam encoding for communications. Other uses are also possible.

Some embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the computer 120 may include one or more processors and may be configured with instructions stored on a computer-readable storage device.

What is claimed is:

1. A reconfigurable aperture, comprising:
   a plurality of metallic particles confined to a volume extending across an aperture area;
   a controller configured to reposition the metallic particles within the volume to form opaque regions in the aperture area;
   wherein the opaque regions, and transmissive regions between the opaque regions, form a reconfigurable zone plate configured to change a collimation of a microwave beam propagating through the reconfigurable zone plate from a first side of the reconfigurable zone plate to a second side of reconfigurable zone plate, opposite the first side.

2. The reconfigurable aperture of claim 1, wherein the opaque regions and transmissive regions are alternately nested.

3. The reconfigurable aperture of claim 2, wherein the opaque regions and transmissive regions are circular and concentric.

4. The reconfigurable aperture of claim 3, wherein the opaque regions and transmissive regions are spaced closer together at increasing distances from their centers.

5. The reconfigurable aperture of claim 4, wherein the opaque regions and transmissive regions have radii that determine a characteristic focal length for a given wavelength.

6. The reconfigurable aperture of claim 4, wherein the opaque regions and transmissive regions have a common center; and
   wherein a location of the common center, with respect to a center of the aperture area, determines a characteristic direction of a microwave beam diffracted through the aperture area.

7. The reconfigurable aperture of claim 1, further comprising:
   a microwave source;
   a detector; and
   a housing that rigidly supports the microwave source and detector at a fixed distance away from the aperture area.

8. The reconfigurable aperture of claim 7, wherein the microwave source is configured to produce microwaves at a selectable specified wavelength within a specified range of wavelengths; and
  wherein the controller is configured to reposition the plurality of metallic particles to form a zone plate having a focal length equal to the fixed distance, for the specified wavelength.

9. The reconfigurable aperture of claim 1, wherein the metallic particles in the plurality of metallic particles are smaller than a wavelength of microwave radiation diffracted through the zone plate.

10. The reconfigurable aperture of claim 1, wherein at least one of the metallic particles comprises a metallic coating on a dielectric core.

11. The reconfigurable aperture of claim 1, wherein at least one of the metallic particles is metallic throughout.

12. The reconfigurable aperture of claim 1, wherein the controller electrostatically repositions the plurality of metallic particles.

13. The reconfigurable aperture of claim 1, wherein the volume is generally planar.

14. A reconfigurable aperture, comprising:
  a plurality of metallic particles confined to a generally planar volume extending across an aperture area;
  a controller configured to electrostatically reposition the plurality of metallic particles within the volume to form opaque regions in the aperture area, wherein the opaque regions, and transmissive regions between the opaque regions, form a reconfigurable zone plate configured to change the collimation of a microwave beam via diffraction therethrough, the opaque regions and transmissive regions being alternately nested, circular, concentric, and spaced closer together at increasing distances from their centers;
  a microwave source configured to produce microwaves at a selectable specified wavelength within a specified range of wavelengths;
  a detector; and
  a housing that rigidly supports the microwave source and detector at a fixed distance away from the aperture area;
  wherein the controller is configured to reposition the plurality of metallic particles to form a zone plate having a focal length equal to the fixed distance, for the specified wavelength.

15. A method, comprising:
  producing, with a microwave energy source, first microwave radiation at a first wavelength;
  repositioning, with signaling by a controller, a plurality of metallic particles within an aperture area to form a first plurality of opaque regions in the aperture area, the first plurality of opaque regions and transmissive regions therebetween forming a first zone plate, the first zone plate having a focal length at the first wavelength equal to the separation between the microwave source and the aperture area;
  collimating, with the first zone plate, the first microwave radiation;
  receiving, with the first zone plate, a first reflected portion of the first microwave radiation;
  focusing, with the first zone plate, the first reflected portion onto a detector;
  producing, at the microwave source, second microwave radiation at a second wavelength;
  repositioning, with the controller, the plurality of metallic particles within the aperture area to form a second plurality of opaque regions in the aperture area, the second plurality of opaque regions and transmissive regions therebetween forming a second zone plate, the second zone plate having a focal length at the second wavelength equal to the separation between the microwave source and the aperture area;
  collimating, with the second zone plate, the second microwave radiation;
  receiving, with the second zone plate, a second reflected portion of the second microwave radiation; and
  focusing, with the second zone plate, the second reflected portion onto the detector.

16. The method of claim 15, wherein:
  the first plurality of opaque regions and transmissive regions therebetween have a first center in a plane of the aperture area;
  the second plurality of opaque regions and transmissive regions therebetween have a second center in the plane of the aperture area; and
  the first and second centers are laterally separated within the plane of the aperture area.

* * * * *

UNITED STATES PATENT AND TRADEMARK OFFICE
CERTIFICATE OF CORRECTION

| | | |
|---|---|---|
| PATENT NO. | : 9,887,459 B2 | Page 1 of 1 |
| APPLICATION NO. | : 14/039179 | |
| DATED | : February 6, 2018 | |
| INVENTOR(S) | : Casciato et al. | |

It is certified that error appears in the above-identified patent and that said Letters Patent is hereby corrected as shown below:

On the Title Page

In item (72), in "Inventors", in Column 1, Line 4, delete "CA" and insert --VA-- therefor In the Specification In Column 4, Line 37, delete "360" and insert --350-- therefor Signed and Sealed this
Twenty-eighth Day of May, 2019

Andrei Iancu
*Director of the United States Patent and Trademark Office*